Figure 2:
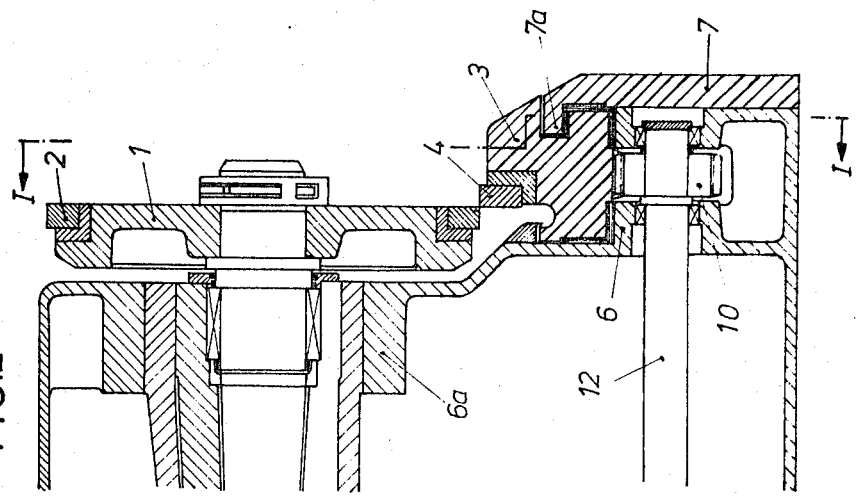

United States Patent

Greis

[15] 3,645,158
[45] Feb. 29, 1972

[54] CIRCULAR CUTTER SHEARS FOR THICK PLATES

[72] Inventor: Karl Wilhelm Greis, St. Ingbert-Saar, Germany

[73] Assignee: Moeller & Neumann GmbH, Ingbert am Saar, Germany

[22] Filed: Dec. 2, 1969

[21] Appl. No.: 881,419

[30] Foreign Application Priority Data

Dec. 8, 1968  Germany .....................P 18 13 463.9

[52] U.S. Cl...................................83/492, 83/500, 83/675
[51] Int. Cl.....................................................B23d 19/04
[58] Field of Search...................83/491, 492, 493, 494, 495, 83/500, 503, 676, 675; 143/44

[56] References Cited

UNITED STATES PATENTS

| | | | |
|---|---|---|---|
| 746,716 | 12/1903 | Lingenfelter | 83/503 X |
| 2,666,485 | 1/1954 | Antosh | 83/675 X |
| 368,618 | 8/1887 | Proctor | 143/44 |
| 628,441 | 7/1899 | Beck | 83/675 X |
| 1,584,868 | 5/1926 | Kutter | 83/675 X |
| 3,387,524 | 6/1968 | Huck | 83/675 X |
| 3,440,915 | 4/1969 | Weyant | 83/676 X |

Primary Examiner—Frank T. Yost
Attorney—John J. Dennemeyer

[57] ABSTRACT

In shears for trimming or slitting heavy plates and in which circular cutters cooperate to effect a cut, at least one of the cutters is in the form of a ring which is internally supported on a stationary segment-shaped bearing. The cutters are rotated by a drive which preferably engages the inner periphery of the cutter ring.

5 Claims, 2 Drawing Figures

CIRCULAR CUTTER SHEARS FOR THICK PLATES

This invention relates to circular cutter shears for thick plates, which have cutters of large diameter and which are intended to be used for example in particular for trimming heavy plates when disposed opposite to other similar shears.

It is known that cutting of heavy plates with circular cutter shears is limited by certain risks which increase with the plate thickness and which include increased hardening of the cut edge and formation of cracks; these risks can be avoided only by the use of circular cutters of large diameter in order to keep the area compression within acceptable limits during a cut. However constructional difficulties and reasons of economy prevent heavy plates from being trimmed and slit with a continuous circular cutter cut by shears in which the known circular cutters have simply been enlarged.

The present invention is based on the problem of providing circular cutter shears in which circular cutters of large diameter and high cutting pressures are permissible without the construction becoming objectionable from the points of view of production of the circular cutters, the bearings of the latter, and the application thereto of the necessary torque.

The solution of this problem is characterized by a ring-shaped construction of at least one, or the larger, cutter of the circular cutter shears and by a segment-shaped bearing which guides the cutter ring laterally and supports it at the inner periphery thereof. The ring may be produced by ring rolling or on a bending machine. According to a preferred embodiment of the invention the circular cutter ring may be mounted without a shaft, whereby production difficulties and bearing difficulties are avoided which must be expected in the case of normal shaft mounting of a disc-shaped circular cutter. Also flexing away occurring with a circular cutter disc of large diameter under cutting pressure is avoided.

In order to avoid the need for producing the circular cutter ring from high quality cutter grade steel, the ring is constructed in accordance with a further development of the invention in the form of a carrier for cutter elements disposed one behind the other on the periphery thereof.

The circular cutter ring is driven with particular advantage by means of a pinion which is in engagement preferably with an inner toothed track of the ring. A drive by means of an outer toothed track is also possible in principle however; the pinion cannot then be disposed on the connecting line between the centers of the two cooperating circular cutters. This disposition is preferable for the reason that the rotary drive transmitted by gearwheels to the other circular cutter can be constructed in a very simple manner.

The invention is not however limited to a drive engaging the circular cutter ring in the vicinity of its periphery. The circular cutter ring may also be connected by spokes to a driven shaft the bearings of which are resiliently pressed against stops under the effect of springs or equivalent means which oppose the cutting pressure. In this case the cutting pressure is absorbed as in the first-mentioned embodiments, by the segment-shaped bearing. The resilient mounting of the shaft bearings serves for the purpose of protecting the construction against difficulties which would otherwise arise from interaction between the two concentric ring supports.

When two circular cutter shears according to the invention with pinion drive are disposed opposite each other in a trimming shears line the segment-shaped bearings for the circular cutter rings may be carried according to a preferred further proposal of the invention by a common understructure, in which case the bearing segment of one of the shears which is unitary with the bearing for the other cutter of said shears, is slidably disposed on the common understructure to permit displacement of the said shears.

Figure 1:
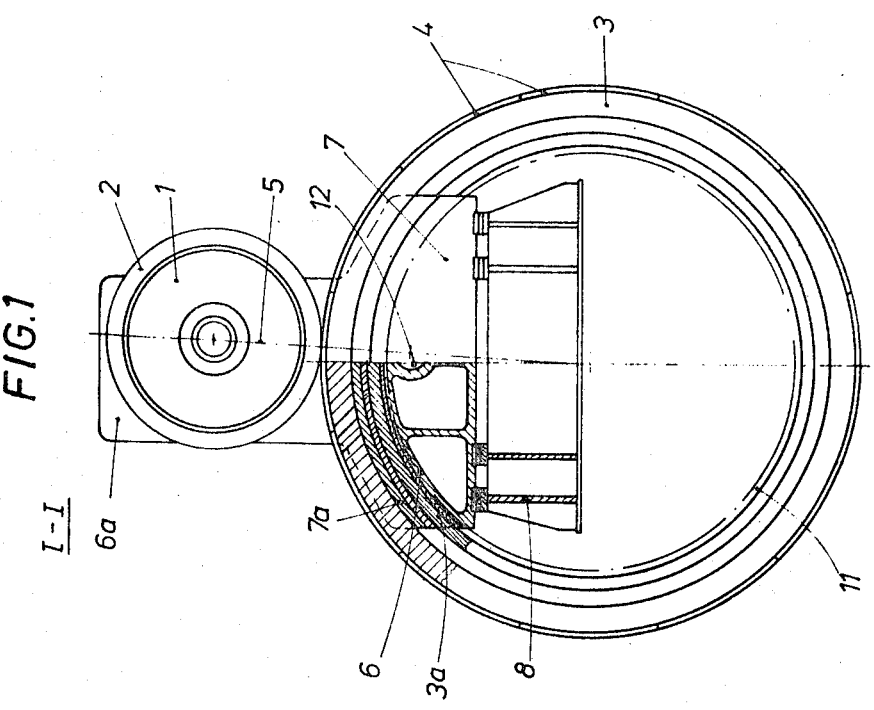

One embodiment of the invention is described below by way of example with reference to the accompanying drawings, in which:

FIG. 1 is a side view in the axial direction, partly in section on the line I—I in FIG. 2, and FIG. 2 is a vertical section through the bearings of the two cutters.

Circular cutter shears illustrated in the drawings have an upper circular cutter disc 1 on which a cutter ring 2 of approximately 1 m. diameter is fixed, such as by a push fit, and a lower cutter ring 3 provided with cutter elements 4 disposed one behind the other on the periphery thereof. The cutter diameter of the cutter ring 3 amounts to approximately 5 m. for cutting heavy plates up to 40 mm. The cutter ring 3, as seen in cross section in FIG. 2, is mounted without a shaft on a stationary segment-shaped bearing 6 which extends over an arc spanning an angle of more than 90°, and which, because of the length of the arc length absorbs the cutting pressure at a very low specific area pressure. The circular cutter ring 3 is also guided laterally by the segment-shaped bearing 6 and for this purpose outer guidance is effected by a plate 7 which can be attached to the latter, such as by screws. The segment-shaped bearing comprises in the present example a bearing structure provided on its upper and lateral surfaces with low friction devices, such as roller bearings, to permit easy rotation of the cutter ring. The plate 7 has a segment-shaped flange 7a which engages into a recess provided in the circular cutter ring 3.

In order to rotate the circular cutter ring 3, a pinion 10 is provided which is mounted in the segment-shaped bearing 6 on a connecting line 5 between the centers of the two circular cutters and which meshes with an internal toothed track 11 of the circular cutter ring. In this manner a large torque can be applied to the circular cutter ring 3 by a fast running motor of relatively low power. When the circular cutter shears are idling the circular cutter ring 3 may be displaced upwardly owing to the effect of the upwardly directed tooth pressures. For this reason the ring is supported also radially outwardly by the segment-shaped flange 7a of the plate 7.

As may be seen from FIG. 2 a bearing 6a for the upper circular cutter 1, 2 is unitary with the segment-shaped bearing 6 for the circular cutter ring 3. Both bearings thus rest according to FIG. 1 on an understructure 8. When two circular cutter shears are disposed opposite to each other this understructure extends from the one shears to the other shears and is thus common to both shears. Since one of the shears must be displaceable for adjustment to suit the width of a plate to be trimmed or slit, one of the two shears is slidably supported on the common understructure 8.

I claim:

1. Circular cutter shears, comprising circular cutters arranged to cooperate for effecting a cut, at least one of said circular cutters being in the form of a cutter ring, a stationary segment-shaped bearing means supporting said cutter ring at an internal surface thereof, a guide means attached to said bearing means to provide lateral guidance for said cutter ring, and drive means for said shears.

2. Circular cutter shears as in claim 1, wherein said cutter ring includes a toothed track and pinion means driving said cutter ring through said track.

3. Circular cutter shears as in claim 2, said pinion means being positioned on a line connecting the centers of said circular cutters.

4. Circular cutter shears as in claim 2, said toothed track being located at the inner periphery of said cutter ring.

5. Circular cutter shears for thick plates, comprising circular cutters of large diameter, one of said cutters being larger than the other of said cutters and in the form of a ring and segment-shaped bearing means supporting said cutter ring at its inner periphery and guiding said cutter ring laterally.

* * * * *